(12) United States Patent
Xue

(10) Patent No.: US 8,189,758 B2
(45) Date of Patent: May 29, 2012

(54) METHOD, APPARATUS AND SYSTEM FOR PLAYING RING BACK TONE

(75) Inventor: Guohai Xue, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 619 days.

(21) Appl. No.: 12/350,533

(22) Filed: Jan. 8, 2009

(65) Prior Publication Data
US 2009/0116624 A1   May 7, 2009

Related U.S. Application Data

(63) Continuation of application No. PCT/CN2008/071265, filed on Jun. 11, 2008.

(30) Foreign Application Priority Data

Jul. 3, 2007   (CN) .......................... 2007 1 0127244

(51) Int. Cl.
H04M 3/42 (2006.01)
(52) U.S. Cl. ................. 379/207.16; 455/414.1
(58) Field of Classification Search .................. 379/179, 379/207.16, 256
See application file for complete search history.

(56) References Cited

U.S. PATENT DOCUMENTS

| | | | |
|---|---|---|---|
| 6,944,277 B1 * | 9/2005 | Viikki | 379/142.06 |
| 7,079,026 B2 * | 7/2006 | Smith | 340/539.22 |
| 2006/0147012 A1 * | 7/2006 | Moody et al. | 379/207.16 |
| 2006/0147021 A1 | 7/2006 | Batni et al. | |
| 2006/0153355 A1 | 7/2006 | Wang et al. | |
| 2006/0291634 A1 * | 12/2006 | Yeh | 379/142.01 |
| 2007/0047523 A1 * | 3/2007 | Jiang | 370/352 |
| 2007/0127642 A1 * | 6/2007 | Bae et al. | 379/88.13 |
| 2007/0190986 A1 | 8/2007 | Lee | |
| 2008/0051071 A1 * | 2/2008 | Vishwanathan et al. | 455/414.1 |
| 2008/0192900 A1 | 8/2008 | Liu | |
| 2010/0219971 A1 * | 9/2010 | Appelman et al. | 340/691.3 |
| 2010/0329442 A1 * | 12/2010 | Lu et al. | 379/207.16 |

FOREIGN PATENT DOCUMENTS

CN   1688151 A   10/2005
(Continued)

OTHER PUBLICATIONS

State Intellectual Property Office of the People's Republic of China, Examination Report in Chinese Patent Application No. 2007103042773 (Dec. 18, 2009). 1$^{st}$ Office Action in corresponding Chinese Application No. 200710127244.6 (May 8, 2009).
Written Opinion of the International Searching Authority in corresponding PCT Application No. PCT/CN2008/071265 (Jul. 24, 2008).
International Searching Authority in corresponding PCT Application No. PCT/CN2008/071265 (Jul. 24, 2008).
2$^{nd}$ Office Action in corresponding European Application No. 08757676.5 (Jan. 9, 2012).

Primary Examiner — Md S Elahee
Assistant Examiner — Solomon Bezuayehu
(74) Attorney, Agent, or Firm — Leydig, Voit & Mayer, Ltd.

(57) ABSTRACT

A method, apparatus and system for playing a Ring Back Tone are provided, and the method includes: determining, according to a call request initiated by a calling party, whether a called party has customized a called-party Ring Back Tone service; further determining, if the called party has customized a called-party Ring Back Tone service, whether the calling party has customized a Ring Back Tone; and playing, if the calling party has customized a Ring Back Tone, a ring tone to the calling party, according to the Ring Back Tone customized by the calling party. According to the above technical solution, the calling party can accurately receive the ring tone selected by the calling party himself in the case that the called party has customized a Ring Back Tone service.

11 Claims, 3 Drawing Sheets

FOREIGN PATENT DOCUMENTS

| | | |
|---|---|---|
| CN | 1816077 A | 8/2006 |
| CN | 1825871 A | 8/2006 |
| CN | 1859449 A | 11/2006 |
| CN | 1859481 A | 11/2006 |
| CN | 1870694 A | 11/2006 |
| CN | 101072256 B | 1/2011 |
| EP | 1 657 900 A1 | 5/2006 |
| EP | 1 672 894 A1 | 6/2006 |
| JP | 200338871 A | 11/2003 |
| WO | WO 2006/009335 A1 | 1/2006 |

\* cited by examiner

METHOD, APPARATUS AND SYSTEM FOR PLAYING RING BACK TONE

CROSS-REFERENCE TO RELATED APPLICATIONS

This application is a continuation of International Patent Application No. PCT/CN2008/071265, filed Jun. 11, 2008, which claims priority to Chinese Patent Application No. 200710127244.6, filed Jul. 3, 2007, both of which are hereby incorporated by reference in their entirety.

FIELD OF THE INVENTION

The present invention relates to the field of communication technology, and, in particular, to a method, apparatus, and system for playing a Ring Back Tone.

BACKGROUND OF THE INVENTION

A Ring Back Tone (RBT) refers to a ring tone sent to a calling terminal after a calling party dials a number of a called party and before the called party hooks off. A Coloring Ring Back Tone (CRBT) refers to a RBT customized by the calling party or the called party. A service for the CRBT customized by the calling party or the called party is a RBT service.

Currently, a RBT system includes a tone playing unit, a call connecting unit, a ring tone content management unit, an Interactive Voice Response (IVR) management unit, a user management unit, and the like, and the RBT service is divided into a calling-party RBT service and a called-party RBT service. For the calling-party RBT service, a RBT is a customized ring tone only when the customizing party of the calling-party RBT service is a calling party. For the called-party RBT service, the RBT is a customized ring tone only when the customizing party of the called-party RBT service is a called party. Otherwise, the RBT is a conventional toot tone. The calling-party RBT service and the called-party RBT service can be distinguished from each other by a Home Location Register (HLR).

The inventor of the present invention has found that the prior art has at least the following problem: in the case that a called party has customized a called-party RBT service, a calling terminal can only receive a called-party-customized RBT.

SUMMARY OF THE INVENTION

Accordingly, an embodiment of the present invention provides a method for playing a RBT, so that a calling terminal can receive a calling-party-customized RBT in the case that a called party has customized a called-party RBT service.

Another embodiment of the present invention provides a RBT apparatus and system for playing a calling-party-customized ring tone and a called-party-customized ring tone in combination, so that selection of a RBT can be more flexible and diverse.

An embodiment of the present invention provides a method for playing a Ring Back Tone, including: determining, according to a call request initiated by a calling party, whether a called party has customized a called-party Ring Back Tone service; further determining, if the called party has customized a called-party Ring Back Tone service, whether the calling party has customized a Ring Back Tone; and playing, if the calling party has customized a Ring Back Tone, a ring tone to the calling party, according to the Ring Back Tone customized by the calling party.

According to the above technical solution, whether a calling party has customized an RBT is determined by a RBT system, and if the calling party has customized a RBT, a calling-party-customized ring tone is played to the calling terminal, thereby ensuring that the calling party can receive the calling-party-customized ring tone in the case that a called terminal has customized a called-party RBT service.

An embodiment of the present invention provides a Ring Back Tone apparatus, including: a combination setting unit, adapted to add, according to a ring tone selection request message, a combination playing identifier into a ring tone parameter identifier corresponding to a user terminal sending the ring tone selection request message; a called party query unit, adapted to query the Ring Back Tone apparatus for a Ring Back Tone service identifier of a called party; and a generating unit, adapted to generate, according to the combination playing identifier set by the combination setting unit and a call request message, a playing command message containing ring tone playing information.

According to the above technical solution of the apparatus, a calling-party-customized ring tone and a called-party-customized ring tone can be played in combination by the Ring Back Tone apparatus, so that selection of a RBT can be more flexible and diverse.

An embodiment of the present invention provides a Ring Back Tone apparatus, including: means for determining, according to a call request initiated by a calling party, whether a called party has customized a called-party Ring Back Tone service; means for further determining, if the called party has customized a called-party Ring Back Tone service, whether the calling party has customized a Ring Back Tone; and means for playing, if the calling party has customized a Ring Back Tone, a ring tone to the calling party, according to the Ring Back Tone customized by the calling party.

According to the above technical solution, whether a calling party has customized an RBT is determined, a calling-party-customized ring tone is played to the calling terminal in the case that the calling party has customized a RBT; thus, it could be ensured that the calling party still can receive the calling-party-customized ring tone in the case that a called terminal has customized a called-party RBT service.

An embodiment of the present invention further provides a Ring Back Tone system, which includes a Ring Back Tone apparatus for determining, according to a call request initiated by a calling party, whether a called party has customized a called-party Ring Back Tone service; further determining, if the called party has customized a called-party Ring Back Tone service, whether the calling party has customized a Ring Back Tone; and playing, if the calling party has customized a Ring Back Tone, a ring tone to the calling party according to the Ring Back Tone customized by the calling party.

According to the above technical solution of the system, a calling-party-customized ring tone and a called-party-customized ring tone can be played in combination by the Ring Back Tone system, so that selection of a RBT can be more flexible and diverse.

In the following, the technical solution of the present invention is further described in detail with reference to the accompanying drawings and embodiments.

DETAILED DESCRIPTION OF THE EMBODIMENTS

In the embodiments of the present invention, a device for determining whether a called party has customized a Ring Back Tone service may be a switching device, such as a Mobile Switching Center (MSC) or a fixed network switching device, and may also be a switching control device, such as a Service Control Point (SCP). In the following, a MSC is taken as an example to describe the embodiments of the present invention.

An Embodiment of the Method

Figure 1:
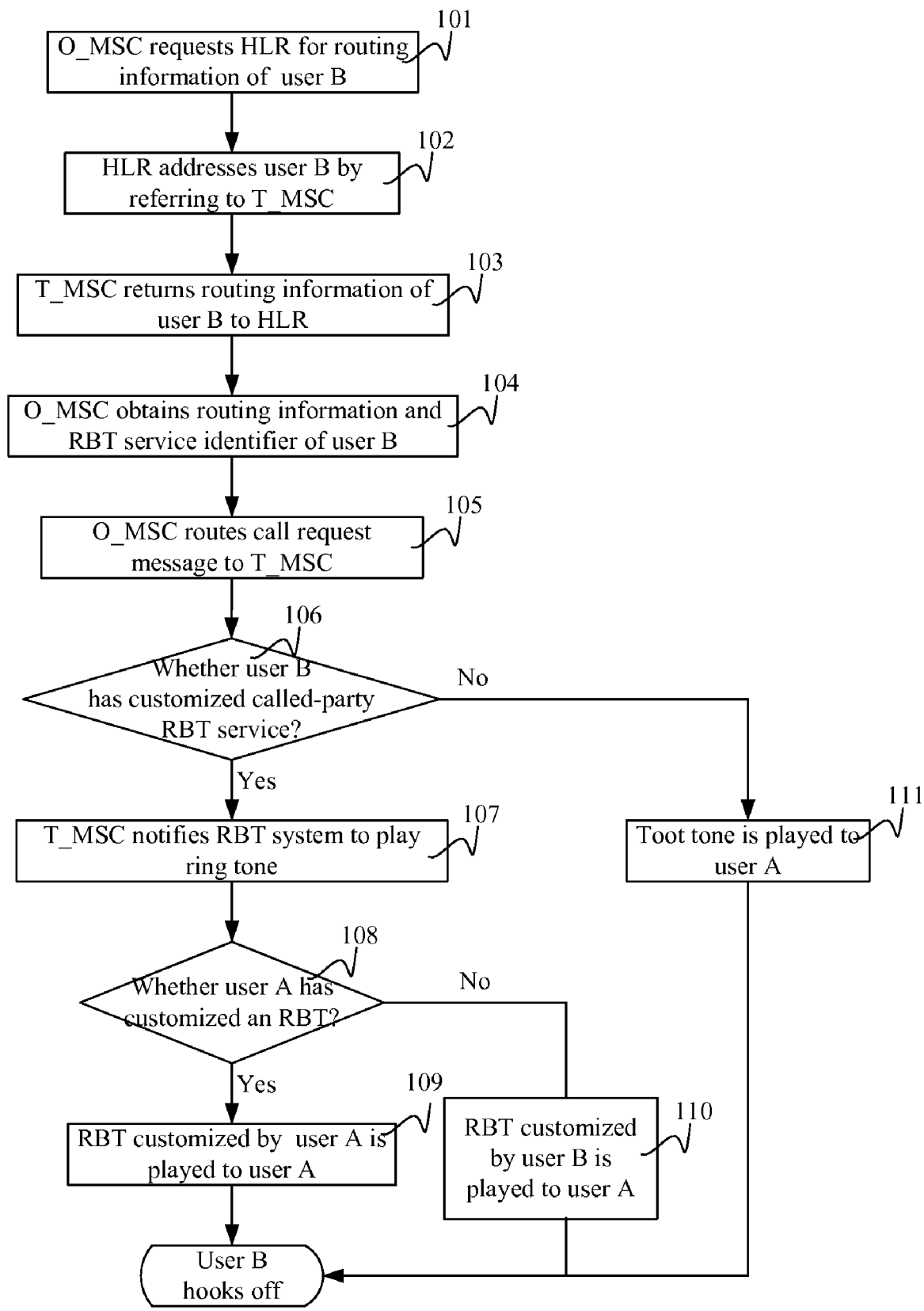
FIG. 1 is a flowchart of a method for playing a Ring Back Tone, according to an embodiment of the present invention.

In this embodiment, it is assumed that a user A calls a user B, a MSC at the user A side is referred to as an O_MSC, and a MSC at the user B side is referred to as a T_MSC. A process for playing a RBT as illustrated in FIG. 1 includes:

Step 101: The O_MSC requests a HLR for routing information of the user B after a call has been received by the O_MSC.

Step 102: The HLR addresses the user B by referring to the T_MSC.

Step 103: The T_MSC returns the routing information of the user B to the HLR.

Step 104: The HLR returns the routing information of the user B to the O_MSC.

Step 105: The O_MSC routes a call request message to the T_MSC.

Step 106: The T_MSC determines whether the user B has customized a called-party RBT service: if so, the process proceeds to Step 107; otherwise, the process proceeds to Step 111.

Step 107: The T_MSC sends to a RBT system a message for playing a ring tone.

Step 108: The RBT system determines whether the user A has customized a RBT; if so, the process proceeds to Step 109; otherwise, the process proceeds to Step 110.

Step 109: A ring tone is played to the user A by the RBT system, according to the RBT customized by the user A, until the user B hooks off.

Step 110: A ring tone of a called-party-customized RBT service customized by the user B is played to the user A.

Step 111: A toot tone is played to the user A by the T_MSC until the user B hooks off.

Another Embodiment of the Method

Figure 2:
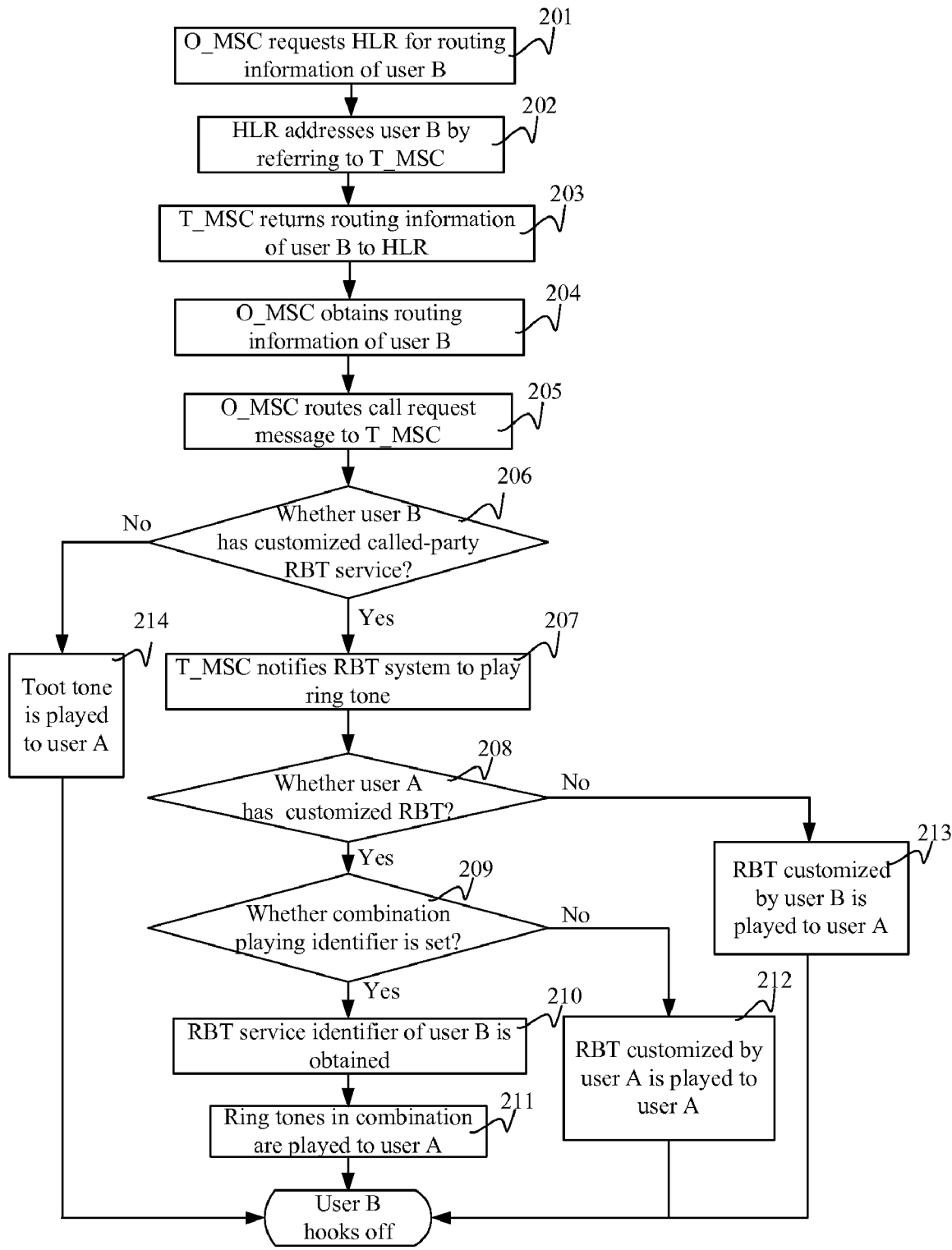
FIG. 2 is a flowchart of a method for playing a Ring Back Tone, according to another embodiment of the present invention.

Similarly, in this embodiment, it is assumed that a user A calls a user B, a MSC at the user A side is referred to as an O_MSC, and a MSC at the user B side is referred to as a T_MSC. A process for playing a RBT as illustrated in FIG. 2 includes:

Step 201: The O_MSC requests a HLR for routing information of the user B after a call has been received by the O_MSC.

Step 202: The HLR addresses the user B by referring to the T_MSC.

Step 203: The T_MSC returns the routing information of the user B to the HLR.

Step 204: The HLR returns the routing information of the user B to the O_MSC.

Step 205: The O_MSC routes a call request message to the T_MSC.

Step 206: The T_MSC determines whether the user B has customized a called-party RBT service: if so, the process proceeds to Step 207; otherwise, the process proceeds to Step 214.

Step 207: The T_MSC notifies a RBT system to play a ring tone.

Step 208: The RBT system determines whether the user A has customized a RBT: if so, the process proceeds to Step 209; otherwise, the process proceeds to Step 213.

Step 209: The RBT system determines whether a combination playing identifier is set in a ring tone parameter identifier corresponding to the user A: if so, the process proceeds to Step 210; otherwise, the process proceeds to Step 212.

Step 210: The RBT system makes a local query to obtain an RBT service identifier of the user B, such as ring tone information customized by the user B. If the user B is not at the same home location as the user A, the RBT system further makes a whole-network query through a whole-network RBT service platform to obtain the RBT service identifier of the user B.

Step 211: The RBT system plays, according to the ring tone customized by the user A and the RBT service identifier of the user B, to the user A a self-owned ring tone of the user A and a ring tone customized by the user B in combination until the user B hooks off, where the self-owned ring tone is a RBT customized by the user A to be played to the user A himself when the user A acts as a calling party.

Step 212: The self-owned ring tone customized by the user A is played to the user A by the RBT system until the user B hooks off.

Step 213: A ring tone of a called-party-customized RBT service customized by the user B is played to the user A by the RBT system until the user B hooks off.

Step 214: A conventional toot tone is played to the user A by the RBT system until the user B hooks off.

In the above embodiments of the method, for the RBT customized by the user A, a ring tone playing rule and a ring tone playing object may be set for different time and/or different called parties correspondingly, according to a ring tone selection request of the user. For example, a self-owned ring tone is set as the RBT from Monday to Friday. In this case, when a ring tone is played by a RBT system, first, whether the current time is in the period of Monday to Friday is determined by comparison of the time set in the playing rule with the current time, and then the self-owned ring tone selected by the user is played, if it is determined that the current time is in such a period. For the called party B, a combination of the self-owned ring tone and a ring tone customized by the called party B is set as the RBT for weekends, where the ring tone of the called party is played first and then the self-owned ring tone is played. In this case, whether the current time is at weekends and whether the current called party is the user B are determined by the RBT system at the same time, and the combined ring tones selected by the user are played, if it is determined that the current time is at weekends and the current called party is the user B. In practice, flexible settings can be made as required.

In the above embodiments of the method, based on an existing called-party RBT service, whether the calling party has customized a RBT is determined by a RBT system triggered by a switching device of the called party, and in the case that the calling party has customized a RBT, the ring tone customized by the calling party is played to the calling terminal. In this way, the problem that a calling terminal can only hear a called-party-customized RBT in the case that a called party has customized a called-party RBT service is solved, so that the calling party can hear the RBT customized by the calling party himself, even in the case that the called party has customized a called-party RBT service. Furthermore, when the method for playing a RBT according to the above embodiments is implemented in a core network, a core network device, such as a HLR and a MSC, and the like, can realize the technical solution of the present invention based on an existing called-party RBT service platform, and no reconstruction is needed, so that the cost for reconstruction can be greatly reduced.

An Embodiment of the Apparatus

Figure 3:
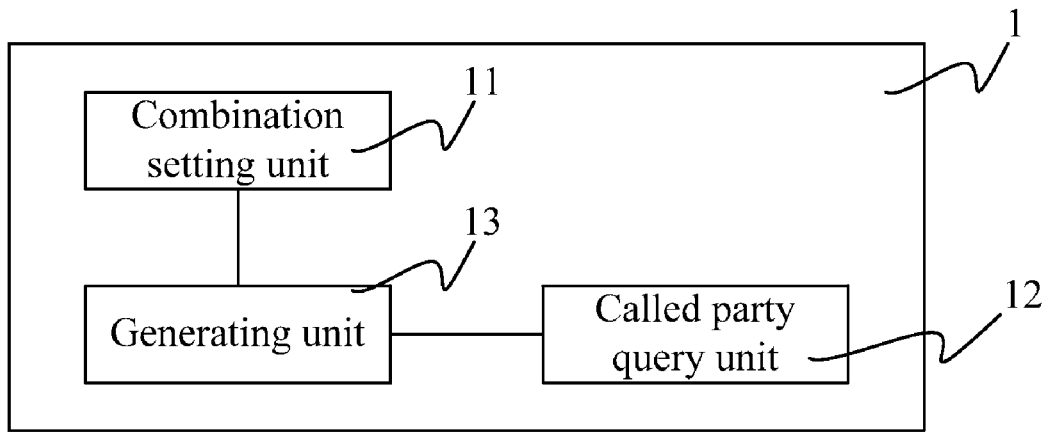
FIG. 3 is a structural diagram of a Ring Back Tone apparatus, according to an embodiment of the present invention.

As illustrated in FIG. 3, a RBT apparatus 1 includes a combination setting unit 11, a called party query unit 12 and a generating unit 13. The combination setting unit 11 is adapted to add, according to a ring tone selection request message, a combination playing identifier into a ring tone parameter identifier corresponding to a user terminal sending the ring tone selection request message. The combination playing identifier indicates that a RBT to be played to the user terminal is a combination of a self-owned ring tone of the terminal user and a ring tone of a called-party-customized RBT service customized by a called terminal. If the ring tone parameter identifier corresponding to the user terminal is in pending status, after the ring tone selection request message of the user terminal has been received by the combination setting unit, it is known that the user asks for combination playing, and the combination setting unit selects, according to the ring tone selection request message, a corresponding combination playing identifier and adds the corresponding combination playing identifier into a selected RBT parameter identifier corresponding to the user terminal. The generating unit 13 is adapted to generate a playing command message containing ring tone playing information, according to the combination playing identifier set by the combination setting unit 11, a call request message, and a query result of the called party query unit 12. When a call is initiated by the user terminal for which a combination ring tone playing rule is set, the generation unit 13 obtains user terminal information, according to the call request message, finds the ring tone parameter identifier corresponding to the user terminal, according to the user terminal information, and generates a command message for query a RBT service identifier of the called party. The called party query unit 12 executes the command to query the RBT service identifier of the called party and returns a query result. The generating unit 13 generates the playing command message containing the ring tone playing information, according to the query result, and the RBT apparatus 1 executes the command and plays a ring tone to the user terminal, according to the ring tone playing information.

Figure 4:
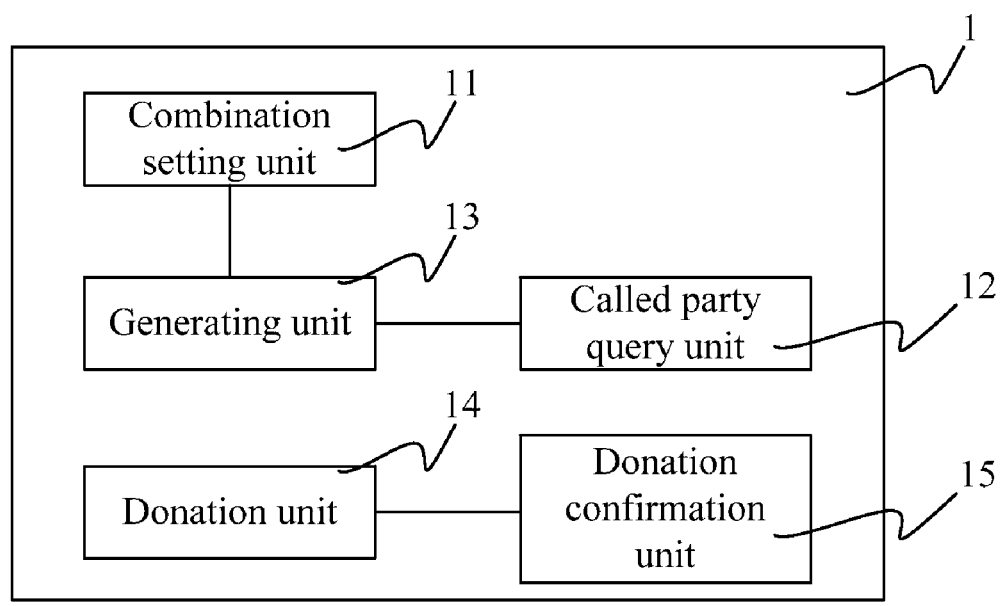
FIG. 4 is a structural diagram of a Ring Back Tone apparatus, according to another embodiment of the present invention.

As illustrated in FIG. 4, based on the RBT apparatus provided in the above embodiment of the apparatus, the RBT apparatus may further include a donation unit 14. If a user A wants to donate a ring tone X to a user B, the user A firstly subscribes the ring tone X through the RBT apparatus. The RBT apparatus sets a subscription identifier of the ring tone X for the user A. After receiving a donation request message, the donation unit obtains the subscription identifier of the ring tone X of the user A, adds the subscription identifier of the ring tone X into a ring tone subscription identifier parameter corresponding to the user B, and removes the subscription identifier of the ring tone X from a ring tone subscription identifier parameter corresponding to the user A. In this way, the right to use the ring tone X is shifted from the user A to the user B, and the ring tone X is donated to the user B by the user A.

Further, the RBT apparatus may also include a donation confirmation unit 15, as illustrated in FIG. 4. After receiving a donation request message, the donation unit 14 generates a donation confirmation command message. The donation confirmation unit 15 makes confirmation to the donation target terminal, determines whether the user agrees to accept a ring tone donation, and returns a confirmation result to the donation unit 14. The donation unit 14 executes a donation operation, according to the confirmation result. Specifically, the donation unit 14 does not execute the donation operation, if the confirmation result is that the user of the donation target terminal does not accept the ring tone donation, and the donation unit 14 executes the donation operation, if the user of the donation target terminal accepts the ring tone donation.

The RBT apparatus provided in the above embodiments can also be used to form a RBT system, together with the switching device of a calling party and/or a called party, such as a MSC and a fixed network switching device, and the like, and a switching control device, such as a network element of a SCP, and the like, so that the combined setting and playing of a calling-party ring tone and a called-party ring tone can be performed by the RBT system, so that selection of a RBT can be more flexible and diverse.

According to the above embodiments of the method according to the present invention, by determining whether a calling party has customized a RBT and playing a calling-party-customized RBT to the calling terminal in the case that the calling party has customized a RBT, the problem that the calling party can only hear a called-party-customized RBT, in the case that a called party has customized a called-party RBT service is solved, so that the calling party can also hear the RBT customized by the calling party himself, in the case that the called party has customized a called-party RBT service. According to the above embodiments of the apparatus and system, a calling-party-customized ring tone and a called-party-customized ring tone can be played in combination by a RBT apparatus and a RBT system through a combination setting unit, a called party query unit, and a generating unit, so that selection of a RBT can be more flexible and diverse.

Those ordinarily skilled in the art can understand that all or part of the steps in the above embodiments of the method can be implemented by program instructing relevant hardware, and the program, which performs a step of the above embodiments of the method when executed, may be stored in a computer readable storage medium, including various mediums capable of storing a program code, such as a ROM, a RAM, a magnetic disk, or a optical disk, and the like.

To sum up, it should be noted that the above embodiments are only illustrative but not limitative to the technical solution of the present invention. Although the invention has been described in detail with reference to some exemplary embodiments, those ordinarily skilled in the art should understand that the technical solution disclosed in the embodiments can be modified or part of the technical features therein can be adapted without departing from the spirit and scope of the invention as defined in the appended claims.

What is claimed is:

1. A method for playing a Ring Back Tone, comprising:
  determining, according to a call request initiated by a calling party, whether a called party has customized a called-party Ring Back Tone service;

further determining, if the called party has customized a called-party Ring Back Tone service, whether the calling party has customized a Ring Back Tone;

determining, if the calling party has customized a Ring Back Tone, whether a combination playing identifier is set in a ring tone parameter identifier corresponding to the calling party; and playing, if the combination playing identifier is set, to the calling party the Ring Back Tone customized by the calling party in combination with the Ring Back Tone customized by the called party.

2. The method according to claim 1, further comprising: obtaining a Ring Back Tone service identifier of the called party.

3. The method according to claim 2, wherein the obtaining the Ring Back Tone service identifier of the called party comprises:

obtaining the Ring Back Tone service identifier by a local query.

4. The method according to claim 3, wherein the obtaining the Ring Back Tone service identifier of the called party further comprises:

obtaining the Ring Back Tone service identifier by a whole-network query.

5. The method according to claim 1, further comprising:

receiving a donation request message, obtaining a ring tone subscription identifier of a donator and adding the ring tone subscription identifier into a ring tone subscription identifier parameter corresponding to a donee.

6. A Ring Back Tone apparatus, comprising:

a combination setting unit, configured to add, according to a ring tone selection request message, a combination playing identifier into a ring tone parameter identifier corresponding to a user terminal sending the ring tone selection request message, wherein the combination playing identifier is used to indicate playing to the calling party the Ring Back Tone customized by the calling party in combination with the Ring Back Tone customized by the called party;

a called party query unit, configured to query the Ring Back Tone apparatus for a Ring Back Tone service identifier of a called party; and a generating unit, configured to generate, according to the combination playing identifier set by the combination setting unit and a call request message, a playing command message containing ring tone playing information.

7. The Ring Back Tone apparatus according to claim 6, further comprising:

a donation unit, adapted to obtain, according to a donation request message, a ring tone subscription identifier and add the ring tone subscription identifier into a ring tone subscription identifier parameter corresponding to a donation target terminal.

8. The Ring Back Tone apparatus according to claim 7, further comprising:

a donation confirmation unit, adapted to make confirmation to the donation target terminal whether a donation is accepted;

wherein the donation unit is further adapted to decide, according to a confirmation result of the donation confirmation unit, whether to execute a donation operation.

9. A Ring Back Tone system, comprising a Ring Back Tone apparatus for determining, according to a call request initiated by a calling party, whether a called party has customized a called-party Ring Back Tone service; further determining, if the called party has customized a called-party Ring Back Tone service, whether the calling party has customized a Ring Back Tone; determining, if the calling party has customized a Ring Back Tone, whether a combination playing identifier is set in a ring tone parameter identifier corresponding to the calling party; and playing, if the combination playing identifier is set, to the calling party the Ring Back Tone customized by the calling party in combination with the Ring Back Tone customized by the called party.

10. The Ring Back Tone system according to claim 9, wherein the Ring Back Tone apparatus comprises:

a combination setting unit, adapted to add, according to a ring tone selection request message, a combination playing identifier into a ring tone parameter identifier corresponding to a user terminal sending the ring tone selection request message;

a called party query unit, adapted to query the Ring Back Tone apparatus for a Ring Back Tone service identifier of the called party; and a generation unit, adapted to generate, according to the combination playing identifier set by the combination setting unit and a call request message, a playing command message containing ring tone playing information.

11. A non-transitory computer program product, comprising a computer program code, wherein the computer program code can make a computer to execute a step of claim 1 when executed by the computer.

* * * * *